United States Patent
Roses et al.

(10) Patent No.: US 8,109,857 B2
(45) Date of Patent: Feb. 7, 2012

(54) VEHICLE LAUNCH DEVICE HAVING FLUID COUPLING AND ELECTRIC MACHINE

(75) Inventors: Victor M. Roses, Ann Arbor, MI (US); John C. Schultz, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 379 days.

(21) Appl. No.: 12/428,924

(22) Filed: Apr. 23, 2009

(65) Prior Publication Data

US 2010/0273606 A1   Oct. 28, 2010

(51) Int. Cl.
*F16H 61/58* (2006.01)
(52) U.S. Cl. .............. 477/64; 477/5; 477/176; 477/180
(58) Field of Classification Search .............. 477/5, 62, 477/64, 65, 67, 68, 168, 169, 166, 174, 176, 477/180; 192/3.25–3.27, 3.63, 3.29–3.3
See application file for complete search history.

(56) References Cited

U.S. PATENT DOCUMENTS

| 7,357,754 B2 | 4/2008 | Roses |
| 2008/0000746 A1 * | 1/2008 | Schiele et al. ............... 192/3.54 |

* cited by examiner

*Primary Examiner* — Justin Holmes

(57) ABSTRACT

An automatic shifting power transmission includes a hydrodynamic fluid drive device, a first reaction clutch disposed in series with the hydrodynamic fluid drive device, a variable capacity clutch disposed in parallel with the hydrodynamic fluid drive device, and an electric machine disposed in series with the hydrodynamic fluid drive device and the first reaction clutch. A method of controlling the automatic transmission includes slipping the first reaction clutch corresponding to a first gear engagement to affect a first gear launch maneuver when engine load is at or above a first predetermined value. The method includes the steps of fully engaging the first reaction clutch corresponding to the first gear engagement when engine load is below the first predetermined value, slipping the variable capacity clutch corresponding to the first gear engagement when engine load is below a second predetermined value, fully engaging a second reaction clutch corresponding to the appropriate gear engagement, depressurizing the hydrodynamic fluid drive device corresponding to a second gear engagement, and energizing the electric machine corresponding to a second gear engagement, the electric machine driving a turbine of the hydrodynamic fluid drive device further removing fluid from the hydrodynamic fluid drive device.

8 Claims, 3 Drawing Sheets

| Manifold Air Pressure | | 1st Predetermined Value | 2nd Predetermined Value | 1 Atm. |
|---|---|---|---|---|
| 1st Gear | First gear clutch | Fully Engaged | Fully Engaged | Paritally Engaged |
| | Variable clutch | Paritally Engaged | Disengaged | Disengaged |
| 2nd Gear | Second gear clutch | Fully Engaged | Fully Engaged | Fully Engaged |
| | Variable clutch | Disengaged | Engaged | Engaged |
| | Electric Machine | Energized | Generating | Generating |
| | Hydrodynamic Fluid Drive Device | Depressurized | Pressurized | Pressurized |
| | Torus (HFDD) | Emptying | Full | Full |

FIG. 5

VEHICLE LAUNCH DEVICE HAVING FLUID COUPLING AND ELECTRIC MACHINE

FIELD

The present disclosure relates to a mechanism and method of controlling an automatic shifting power transmission.

BACKGROUND

The statements in this section merely provide background information related to the present disclosure and may or may not constitute prior art.

In automatic shifting power transmissions, gear ratio changes are effected by selectively connecting members of planetary gear sets. This is accomplished by selectively engaging torque-transmitting devices such as brakes or clutches. For each gear ratio change, there is a corresponding sequence of off-going clutch disengagement and on-coming clutch engagement. By providing a regulated fluid pressure gain to the clutches, the smooth engagement and disengagement of the clutches may be accomplished.

Additionally, a majority of automatic shifting power transmissions employ a hydrodynamic fluid drive, such as a torque converter or a fluid coupling, between the power source (engine) and a multi-speed gear configuration, such as the planetary gear arrangement discussed above. This hydrodynamic fluid drive will allow the vehicle to come to rest without stalling the engine and will provide a measure of isolation preventing the torsional vibrations, caused by the firing events of the engine, from being transmitted though the powertrain.

As is well known, the hydrodynamic fluid drive is a slipping drive that has a high efficiency loss at vehicle launch. This loss decreases, but is still present, as the hydrodynamic fluid drive approaches a 1 to 1 speed ratio at high speed and low torque.

The stall speed of the hydrodynamic fluid drive is an important consideration for proper vehicle launch. The stall speed is the speed at which the hydrodynamic fluid drive will hold the engine speed and not allow further gain. The stall speed is usually chosen based on engine torque characteristic, vehicle weight, vehicle duty cycle, etc. A properly selected stall speed will allow the engine to spin to the peak torque range to affect a strong vehicle launch. The stall speed of the converter cannot be varied or tuned while in use, therefore, there may be certain trade-offs such as part throttle efficiency when selecting the stall speed.

However, once a hydrodynamic fluid drive is selected with a specific stall speed that stall speed cannot be adjusted regardless of changing conditions or circumstances. Therefore, it is desired to be able to alter the effective stall speed of the hydrodynamic fluid drive. Under certain circumstances a higher stall speed is desired to improve launch performance of the transmission. Under other circumstances, a lower stall speed is beneficial by providing sufficient launch performance while improving efficiency or other performance parameters.

Other considerations have been given to improving the overall efficiency of the transmission. For example, the use of a starting clutch in lieu of a torque converter has been suggested and in some instances utilized. The advent of electronic controls improves the operation of a starting clutch as a vehicle launch device. The clutch is, however, a rotating device with all of the complexities associated with such a device. The control needs considerable accuracy to insure consistent fill times and to compensate for variable fluid leaks at the rotating shaft seals. This requires accurate hydraulic flow volumes and pressure control over a wide range of operating requirements. The starting clutch fulfills the requirements of the hydrodynamic fluid drive. These include, for example, shift and launch quality, driveline isolation, mass, peak acceleration, and durability.

SUMMARY

In one aspect of the present disclosure a method of controlling an engine mounted automatic shifting power transmission is provided. The transmission includes a hydrodynamic fluid drive device, a first reaction clutch disposed in series with the hydrodynamic fluid drive device, a variable capacity clutch disposed in parallel with the hydrodynamic fluid drive device, and an electric machine disposed in series with the hydrodynamic fluid drive device and the first reaction clutch. The method comprises monitoring engine load, fully engaging the first gear clutch and partially engaging the variable capacity clutch when engine load is below a first predetermined value, fully engaging the first gear clutch and disengaging the variable capacity clutch when the engine load is above the first predetermined value and below a second predetermined value, partially engaging the first gear clutch and disengaging the variable capacity clutch when the engine load is above the second predetermined value, disengaging the first gear clutch and engaging a second gear clutch, energizing the electric machine, depressurizing the hydrodynamic fluid drive device and driving the turbine with the electric machine to partially empty the hydrodynamic fluid drive device.

In another aspect of the present disclosure, the method of controlling the automatic shifting power transmission further includes disengaging the first reaction clutch corresponding to the first gear engagement when the automatic shifting power transmission is in either a drive or a neutral gear state and the engine is idling.

In yet another aspect of the present disclosure, the hydrodynamic fluid drive device is a fluid coupling.

In yet another aspect of the present disclosure, the variable capacity clutch is an electronically controlled capacity clutch.

Another embodiment of the automatic shifting power transmission of the present disclosure includes an electric machine, a hydrodynamic fluid coupling device, a variable capacity clutch in parallel relationship with the hydrodynamic fluid coupling device, the variable capacity clutch being operable to slip during a first gear launch maneuver, and a first reaction clutch in series relationship with the hydrodynamic fluid coupling device. The first reaction clutch being operable to slip during a first gear launch maneuver. The electric machine is drivably connected in series relationship with the hydrodynamic fluid coupling device, the variable capacity clutch, and the first reaction clutch.

In another aspect of the present disclosure, the hydrodynamic fluid drive device is a fluid coupling.

In yet another aspect of the present disclosure, the variable capacity clutch is an electronically controlled capacity clutch.

In yet another aspect of the present disclosure, the automatic shifting power transmission further includes an input member drivingly connected to the hydrodynamic fluid drive device and to the variable capacity clutch, the input member including a damper.

In yet another aspect of the present disclosure, the automatic shifting power transmission further includes an interconnecting member driving connected to the hydrodynamic fluid drive device, the variable capacity clutch, and the electric machine. The interconnecting member includes a damper.

In yet another aspect of the present disclosure, the damper includes a compliant member and a lock-out clutch.

In yet another aspect of the present disclosure, the automatic shifting power transmission further includes a second reaction clutch in series relationship with the hydrodynamic fluid drive device and the electric machine.

Another embodiment of a method of controlling an automatic shifting power transmission of the present disclosure includes providing an hydrodynamic fluid drive device, providing a first gear reaction clutch in series with the hydrodynamic fluid drive device, providing a variable capacity clutch in parallel relationship with the hydrodynamic fluid drive device, providing an electric machine in series relationship with the hydrodynamic fluid drive device and the first gear reaction clutch, providing an engine mounted to the transmission, slipping the first gear reaction clutch to effect the first gear launch maneuver when an engine load is at or above a first predetermined value, and fully engaging the first gear reaction clutch corresponding to the first gear engagement when engine load is below the first predetermined value, slipping the variable capacity clutch corresponding to the first gear engagement when engine load is below a second predetermined value, fully engaging a second reaction clutch corresponding to a second gear engagement, depressurizing the hydrodynamic fluid drive device corresponding to the second gear, and energizing the electric machine corresponding to a second gear engagement as the electric machine drives a turbine of the hydrodynamic fluid drive device further removing fluid from the hydrodynamic fluid drive device.

In another aspect of the present disclosure, the method of controlling an automatic shifting power transmission further includes disengaging the first gear reaction clutch when the automatic shifting power transmission is in either a drive or a neutral gear state and the engine is idling.

In yet another aspect of the present disclosure, the hydrodynamic fluid drive device is a fluid coupling.

In yet another aspect of the present disclosure, the method of controlling an automatic shifting power transmission further includes providing a damper in series relationship with the engine and hydrodynamic fluid drive device.

Further objects, aspects and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

FIG. 5 is a chart illustrating an example of the operating condition of the powertrain according to gear state and engine load according to the principles of the present disclosure.

DETAILED DESCRIPTION

Figure 1:
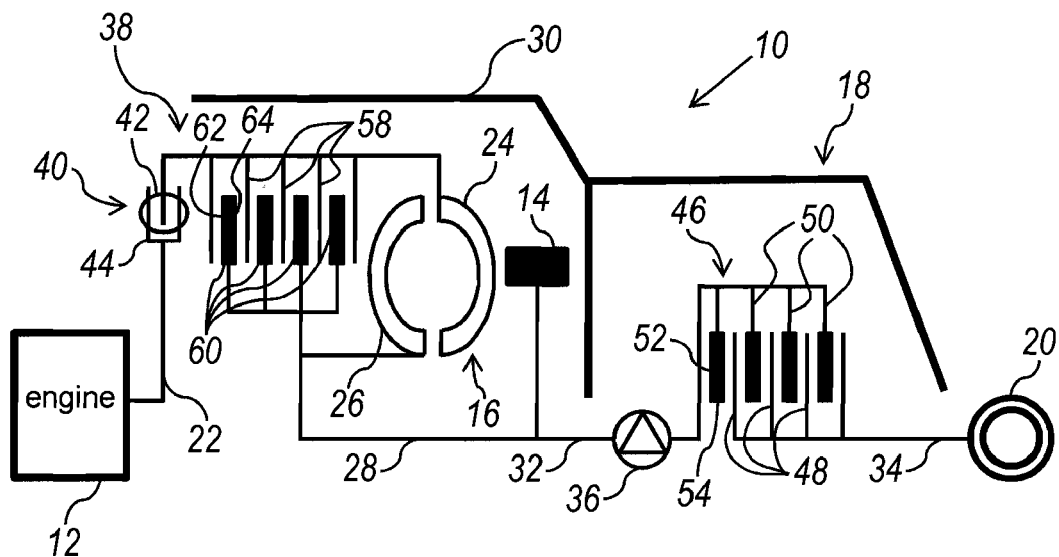
FIG. 1 is a schematic view of an embodiment of a powertrain according to the present disclosure.

With reference to FIG. 1, a powertrain according to the principles of the present disclosure is generally indicated by reference number 10. The powertrain 10 includes a first or primary power source 12, a second or secondary power source 14, a fluid coupling device 16, a transmission 18, and a final drive mechanism 20. In the example provided, the first power source 12 is an internal combustion engine, however the first power source 12 may be an electric motor or machine without departing from the scope of the present disclosure. The first power source 12 includes an output member 22. The first power source 12 is operable to provide an output torque or power to the output member 22. The second power source 14 is preferably an electric motor having a stator and rotor, as is known in the art.

The fluid coupling device 16 includes a pump section 24 and a turbine section 26. The fluid coupling device 16 includes a hydraulic fluid, such as an oil, located within the pump section 24 and the turbine section 26 that hydrodynamically couples the pump section 24 with the turbine section 26, as is known in the art. The pump section 24 is interconnected with the output member 22 of the first power source 12. The turbine section 24 is interconnected with a first intermediate or interconnecting member 28. The fluid coupling device 16 is preferably located in a bell housing portion 30 forward of the transmission 18.

The transmission 18 is preferably a multi-speed automatic shifting power transmission and includes a transmission gearbox input shaft 32 and a transmission output shaft 34. The transmission gearbox input shaft 32 is interconnected to the second power source 14. A mechanical transmission pump 36 is connected with the transmission gearbox input shaft 32 and is operable to provide pressurized hydraulic fluid to the various components of the transmission 18. The transmission 18 further includes a plurality of gear sets (not shown) and torque transmitting devices (not shown) that cooperate to provide a plurality of forward and reverse gear or speed ratios between the transmission gearbox input shaft 32 and the transmission output shaft 34.

The final drive mechanism 20 is interconnected to the transmission output shaft 34. The final drive mechanism 20 may have various components without departing from the scope of the present disclosure and may include a differential, axles, and drive wheels.

The powertrain 10 further includes a variable capacity clutch 38 in parallel with the fluid coupling device 16. More specifically, the variable capacity clutch 38 is interconnected to the engine output member 22 and the transmission gearbox input shaft 32. The variable capacity clutch 38 is operable to lock the engine output member 22 to the transmission gearbox input shaft 32 thereby allowing them to rotate in unison. By locking the transmission gearbox input shaft 32 to the engine output member 22, the efficiency of the powertrain 10 will increase by reducing the slip losses of the fluid coupling device 16. In a preferred embodiment, the variable capacity clutch 38 is an electronically controlled capacity clutch. The electronically controlled capacity clutch will allow a slight amount of slip to occur between the transmission gearbox input shaft 32 and the engine output member 22. This slip decouples the transmission gearbox input shaft 32 and the engine output member 22 and helps to attenuate the transmission 18 of torsional vibrations created by the firing events of the primary power source 12 to the remainder of the powertrain 10.

The variable capacity clutch 38 includes a plurality of reaction plates 58 interleaved with a plurality of friction plates 60. Each of the friction plates 60 has a first friction-facing layer 62 and a second friction-facing layer 64 each disposed on opposite faces of the friction plate 60. The friction-facing layers 62 and 64 frictionally engage the reaction plates 58.

In the example provided, the engine output member 22 includes a damper 40 in series with the lock-up clutch 40 and the first power source 12. The damper 40 operates to further isolate the torsional vibrations created by the firing events of the first power source 12. The damper 40 may include a compliant member 42 such as a spring. The damper 40 may also include a lock-out clutch 44 operable to bypass the compliant member 42. The lock-out clutch 44 is useful when starting or stopping the primary power source 12 as the primary power source 12 may produce a resonance at low engine speeds.

The powertrain 10 further includes a first gear reaction clutch 46 located within the transmission 18 and interconnected with the transmission gearbox input shaft 32 and the transmission output shaft 34. The first gear reaction clutch 46 is selectively engageable and operable to selectively lock, unlock, and partially engage the transmission gearbox input shaft 32 with the transmission output shaft 34. The reaction clutches 46 is preferably a fluid-operated multi-plate clutch. The reaction clutches 46 is selectively controlled in engaged and disengaged states by conventional electro-hydraulic mechanisms, not shown, which include a hydraulic valve arrangement and an electronic control unit (ECU) that incorporates a conventional programmable digital computer. The reaction clutch 46 is engaged and disengaged in accordance with performance and operating signals such as, for example, engine speed, vehicle speed, and engine torque to name a few. Those familiar with the art of transmission control will be familiar with the many features and functions that are available with electronic controls.

The reaction clutch 46 includes a plurality of reaction plates 48 interleaved with a plurality of friction plates 50. Each of the friction plates 50 has a first friction-facing layer 52 and a second friction-facing layer 54 each disposed on opposite faces of the friction plate 50. The friction-facing layers 52 and 54 frictionally engage the reaction plates 48.

FIG. 1 is a schematic representation of the powertrain 10 illustrating the neutral/drive gear state and engine idle mode of operation. In this mode, the first gear reaction clutch 36 is disengaged, thereby decoupling the transmission output shaft 34 from the transmission gearbox input shaft 32 thereby minimizing the reaction force imparted on the turbine section 26 of the fluid coupling device 16. As a result, the parasitic losses produced by slipping the fluid coupling device 16 are minimized.

Figure 2:
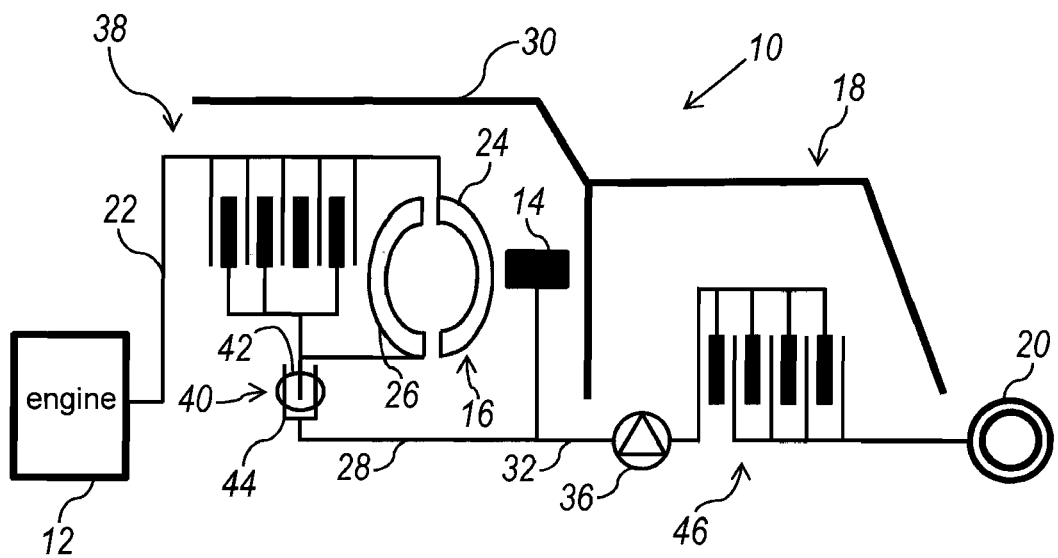
FIG. 2 is a schematic view of another embodiment of a powertrain according to the present disclosure.

With reference to FIG. 2, a schematic representation of the powertrain 10 is shown that illustrates another embodiment of the present disclosure. In this embodiment, the first intermediate or interconnecting member 28 includes a damper 40 in series with the variable capacity clutch 38 and the transmission gearbox input shaft 32. The damper 40 operates to further isolate the torsional vibrations created by the firing events of the first power source 12 transmitted through the engine output member 22 and variable capacity clutch 38. The damper 40 may include a compliant member 42 such as a spring. The damper 40 may also include a lock-out clutch 44 operable to bypass the compliant member 42. The lock-out clutch 44 is useful when starting or stopping the primary power source 12 as the primary power source 12 may produce a resonance at low engine speeds.

Figure 3:
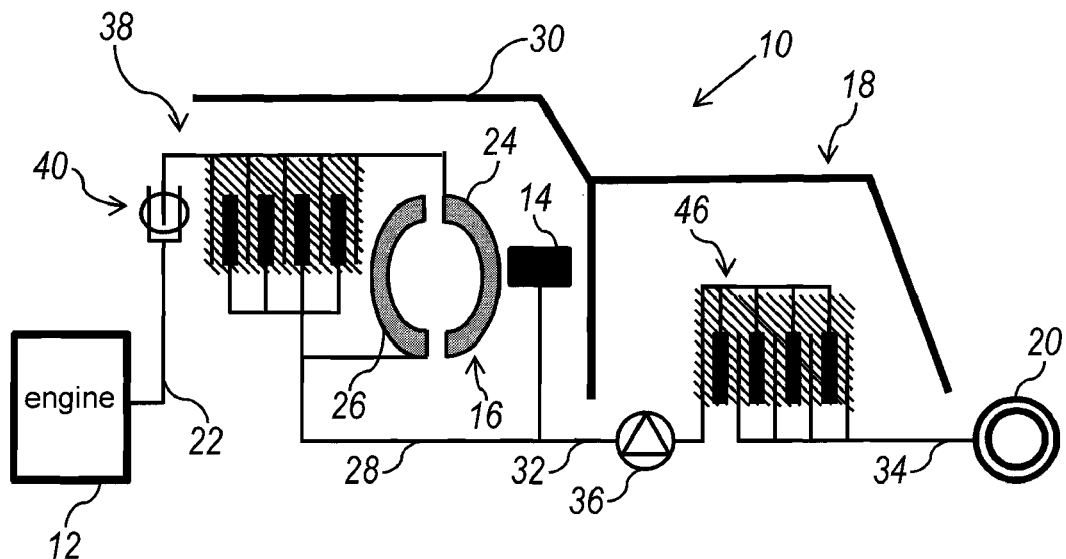
FIG. 3 is a schematic view of an embodiment of a powertrain according to the present disclosure in a first gear launch mode of operation.

With reference to FIG. 3, a schematic representation of the powertrain 10 is shown that illustrates the first gear launch mode of operation. In this mode, the fluid coupling device 16 is filled and charged with hydraulic fluid, the second power source 14 is optionally engaged to provide additional torque to the transmission gearbox input shaft 32, and the first gear reaction clutch 46 and the variable capacity clutch 38 may be controlled in a slipping condition in order to vary the stall speed of the transmission 10. More specifically, in order to increase the stall speed of the transmission 10, the first gear reaction clutch 46 is controlled in a slipping condition. By slipping the first gear reaction clutch 46, the first power source 12 can spin to its peak torque band while the fluid coupling device 16 is transferring all the torque from the first power source. This allows a strong vehicle launch, thus effectively increasing the stall speed of the transmission 10. In order to decrease the stall speed of the transmission 10, the variable capacity clutch 38 is controlled in a slipping condition and the first gear reaction clutch 46 is locked effectively connecting the transmission gearbox input shaft 32 and the transmission output shaft 34. By slipping the variable capacity clutch 38 and locking the first gear reaction clutch 46, for any given speed of the first power source 12 some of the torque from the first power source 12 bypasses the fluid coupling device 16 through the variable capacity clutch to the locked first gear reaction clutch 46 and the transmission output shaft 34. In effect, slipping the variable capacity clutch 38 reduces the stall speed of the transmission 10. The result is a transmission 10 that is tunable to various engine throttle settings. Consideration should be paid to the selection of materials for the friction facing layers 62 and 64, as they will now be subject to a more severe duty cycle.

Figure 4:
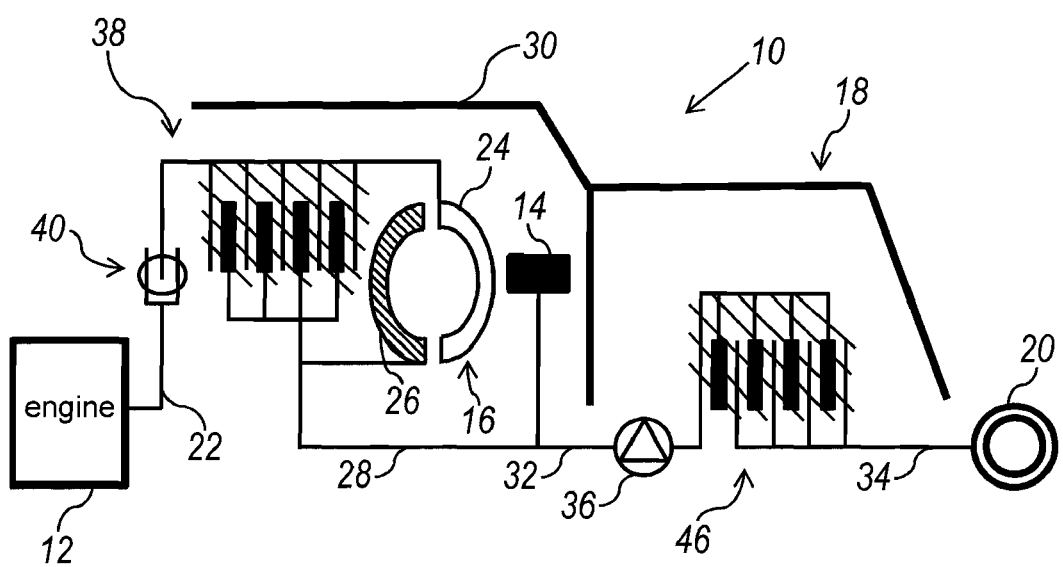
FIG. 4 is a schematic view of an embodiment of a powertrain according to the present disclosure in a second gear or higher mode of operation.

Turning now to FIG. 4, the powertrain 10 is shown in a second gear and higher mode of operation. In this mode of operation, the fluid coupling device 16 is only partially filled with hydraulic fluid thereby reducing spin losses within the fluid coupling device 16, the first gear reaction clutch 46 is closed or fully engaged, and the variable capacity clutch 38 is closed or fully engaged. Accordingly, a zero slip condition is maintained between the engine output member 22 and the transmission gearbox input shaft 32 and a zero slip condition is maintained between the transmission gearbox input shaft 32 and the transmission output shaft 34.

In pure electric mode of operation where the primary power source 12 is disengaged and the second power source 14 is engaged, the variable capacity clutch 38 disconnects the engine output member 22 from the first intermediate or interconnecting member 28. The fluid coupling device 16 further reduces the fluid amount by using torque from the second power source 14 to turn the turbine 26 and pump the fluid from the fluid coupling device 16 thus further reducing spin losses in pure electric mode.

The operating condition shown in FIG. 2 is effective at high engine load. For low MAP values, the operating condition shown in FIG. 3 will be commanded.

With reference to FIG. 5, a summary of the operating conditions of the powertrain 10 are shown in a table format. For a given gear state and a given engine load, the operation of the various components of the powertrain 10 are indicated. For example, in a first gear state with engine load below a first predetermined value, the first gear clutch 46 is fully engaged and the variable clutch 38 is disengaged.

The benefits of the present disclosure may include enhanced fuel economy, enhanced driveability over a wide range of operating conditions, and improved lock-up clutch performance. Additionally the present disclosure may reduce cost, mass, and packaging requirements by eliminating the stator within the torque converter or enabling the use of a smaller torque converter in some applications.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A method of controlling an engine mount automatic shifting power transmission, the transmission hydrodynamic fluid drive device, a first reaction clutch disposed in series with the hydrodynamic fluid drive device, a variable capacity clutch disposed in parallel with the hydrodynamic fluid drive device, and an electric machine disposed in series with the hydrodynamic fluid drive device and the first reaction clutch, the method comprising:
  monitoring engine load;
  fully engaging the first gear clutch and partially engaging the variable capacity clutch when engine load is below a first predetermined value;
  fully engaging the first gear clutch and disengaging the variable capacity clutch when the engine load is above the first predetermined value and below a second predetermined value;
  partially engaging the first gear clutch and disengaging the variable capacity clutch when the engine load is above the second predetermined value;
  disengaging the first gear clutch and engaging a second gear clutch when engine load approaches zero;
  energizing the electric machine, depressurizing the hydrodynamic fluid drive device, and driving the turbine with the electric machine to partial empty the hydrodynamic fluid drive device when second gear is fully engaged and engine load is below the first predetermined value.

2. The method of controlling the automatic shifting power transmission of claim 1 further comprising disengaging the first reaction clutch when the automatic shifting power transmission is in either a drive or a neutral gear state and the engine is idling.

3. The method of controlling the automatic shifting power transmission of claim 1, wherein the hydrodynamic fluid drive device is a fluid coupling.

4. The method of controlling the automatic shifting power transmission of claim 3, wherein the variable capacity clutch is an electronically controlled capacity clutch.

5. A method of controlling an automatic shifting power transmission comprising:
  providing an hydrodynamic fluid drive device;
  providing a first gear reaction clutch in series with the hydrodynamic fluid drive device;
  providing a variable capacity clutch in parallel relationship with the hydrodynamic fluid drive device;
  providing an electric machine in series relationship with the hydrodynamic fluid drive device and the first gear reaction clutch;
  providing an engine mounted to the transmission;
  slipping the first gear reaction clutch to effect the first gear launch maneuver when an engine load is at or above a first predetermined value; and
  fully engaging the first gear reaction clutch corresponding to the first gear engagement when engine load is below the first predetermined value;
  slipping the variable capacity clutch corresponding to the first engagement when engine load is below a second predetermined value;
  fully engaging a second reaction clutch corresponding to a second gear engagement when engine load approaches zero;
  depressurizing the hydrodynamic fluid drive device corresponding to the second gear; and
  energizing the electric machine corresponding to a second engagement when second gear is fully engaged and engine load is below the first predetermined value, the electric machine driving a turbine hydrodynamic fluid drive device further removing fluid from the hydrodynamic fluid drive device.

6. The method of controlling an automatic shifting power transmission of claim 5, further comprising: disengaging the first gear reaction the automatic shifting power transmission is in either a drive or a neutral gear state and the engine is idling.

7. The method of controlling an automatic shifting power transmission of claim 5, wherein the hydrodynamic fluid drive device is a fluid coupling.

8. The method of controlling an automatic shifting power transmission of claim 5 further comprising providing a damper in series relationship with the engine and hydrodynamic fluid drive device.

* * * * *